United States Patent
Koshiishi et al.

(10) Patent No.: US 9,518,153 B2
(45) Date of Patent: *Dec. 13, 2016

(54) POLYMERIZABLE COMPOSITION FOR OPTICAL MATERIALS

(71) Applicant: MITSUBISHI GAS CHEMICAL COMPANY, INC., Tokyo (JP)

(72) Inventors: Eiji Koshiishi, Chiba (JP); Hitoshi Okazaki, Chiba (JP); Motoharu Takeuchi, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/380,809

(22) PCT Filed: Feb. 27, 2013

(86) PCT No.: PCT/JP2013/055089
§ 371 (c)(1),
(2) Date: Aug. 25, 2014

(87) PCT Pub. No.: WO2013/129460
PCT Pub. Date: Sep. 6, 2013

(65) Prior Publication Data
US 2015/0011727 A1    Jan. 8, 2015

(30) Foreign Application Priority Data

Mar. 1, 2012 (JP) ................. 2012-045598

(51) Int. Cl.
C08G 75/00 (2006.01)
C08G 75/08 (2006.01)
G02B 1/04 (2006.01)

(52) U.S. Cl.
CPC ............... *C08G 75/08* (2013.01); *G02B 1/04* (2013.01); *G02B 1/041* (2013.01)

(58) Field of Classification Search
CPC ............. C08G 75/08; G02B 1/04; C08L 81/00
USPC ........................................ 528/375
See application file for complete search history.

(56) References Cited

U.S. PATENT DOCUMENTS

| | | | |
|---|---|---|---|
| 4,279,720 | A | 7/1981 | Berner |
| 4,569,997 | A | 2/1986 | Karrer et al. |
| 6,117,923 | A | 9/2000 | Amagai et al. |
| 6,130,307 | A | 10/2000 | Amagai et al. |
| 6,472,495 | B1 | 10/2002 | Yoshimura et al. |
| 6,534,589 | B1 | 3/2003 | Yoshimura et al. |
| 2001/0002413 | A1 | 5/2001 | Morijiri et al. |
| 2001/0030734 | A1 | 10/2001 | Kosaka |
| 2003/0225202 | A1 | 12/2003 | Kosaka |
| 2009/0018308 | A1 | 1/2009 | Kamura et al. |
| 2009/0156781 | A1 | 6/2009 | Ihara et al. |
| 2012/0010361 | A1* | 1/2012 | Urakawa ............ C08F 2/44 524/730 |
| 2013/0068299 | A1* | 3/2013 | Okaniwa et al. ....... 136/257 |

FOREIGN PATENT DOCUMENTS

| | | |
|---|---|---|
| CN | 101463133 A | 6/2009 |
| EP | 0094343 A1 | 11/1983 |
| JP | 10-146849 | 6/1998 |
| JP | 11-292950 | 10/1999 |
| JP | 2001-131257 | 5/2001 |
| JP | 2001-330701 | 11/2001 |
| JP | 3373800 | 11/2002 |
| JP | 3465528 | 8/2003 |
| JP | 2004-59901 | 2/2004 |
| JP | 3589129 | 8/2004 |
| JP | 3621600 | 11/2004 |
| JP | 2005-272785 | 10/2005 |

(Continued)

OTHER PUBLICATIONS

Search report from International Bureau of WIPO in PCT/JP2013/055089, mail date is May 21, 2013.

(Continued)

*Primary Examiner* — Shane Fang
(74) *Attorney, Agent, or Firm* — Greenblum & Bernstein, P.L.C.

(57) ABSTRACT

The present invention addresses the problem of providing: a catalyst for preliminary reaction and a preliminary reaction method, which are suitable for a composition that is obtained by adding a thiol compound and an isocyanate compound to an episulfide compound; and a polymerizable composition for optical materials, which is capable of preventing yellowing of an optical material which contains a composition that is obtained by adding a thiol compound and an isocyanate compound to an episulfide compound. The above-mentioned problem can be solved by a polymerizable composition for optical materials, which contains a thiourethane oligomer that is obtained by preliminarily reacting the whole or a part of a thiol compound and an isocyanate compound in a composition that contains an episulfide compound, the thiol compound and the isocyanate compound, while using a compound represented by formula (2) below as a catalyst for preliminary reaction (2)

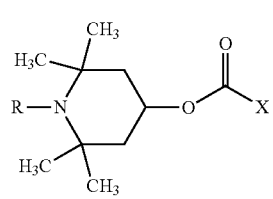

In formula (2), R represents an alkyl group having 1 to 4 carbon atoms; and X represents an organic group which has 2 to 11 carbon atoms and contains a vinyl group, a vinylidene group or a vinylene group.

8 Claims, No Drawings

(56) References Cited

FOREIGN PATENT DOCUMENTS

| | | |
|---|---|---|
| JP | 2007-084629 | 4/2007 |
| JP | 2007-197615 | 8/2007 |
| JP | 2007-321072 | 12/2007 |
| JP | 4291190 | 4/2009 |
| KR | 10-2008-0007562 A | 1/2008 |
| WO | 2012/147709 | 11/2012 |

OTHER PUBLICATIONS

Chinese Office Action issued with respect to application No. 201380011322.X, mail date is Sep. 30, 2015.

* cited by examiner

POLYMERIZABLE COMPOSITION FOR OPTICAL MATERIALS

TECHNICAL FIELD

The present invention relates to a polymerizable composition for optical materials, and further relates to an optical material using the same such as a plastic lens, a prism, an optical fiber, an information recording substrate, a filter and the like. In particular, the present invention is suitably used as a plastic lens.

BACKGROUND ART

Plastic materials are lightweight, highly tough and easy to be dyed, and therefore are widely used recently for various types of optical materials, particularly eyeglass lenses. Optical materials, particularly eyeglass lenses, are specifically required to have, as properties, low specific gravity, high transparency and low yellowness, and as optical properties, high refractive index and high Abbe number, and high heat resistance, high strength, etc. A high refractive index allows a lens to be thinner, and a high Abbe number reduces the chromatic aberration of a lens. High strength facilitates secondary processing and is important in terms of safety, etc. Examples of the technique of simultaneously achieving high refractive index and high Abbe number as optical properties and high heat resistance include use of an episulfide compound, but optical materials made of the compound have a problem in that it is difficult to obtain high strength. For this reason, the improvement of strengths such as tensile strength and impact resistance by the addition of a thiol compound and an isocyanate compound to an episulfide compound has been examined (see Patent Documents 1-4).

[Problem 1]

In the case of the polymerization reaction of the composition in which a thiol compound and an isocyanate compound are added to an episulfide compound, various reactions such as a simple polymerization reaction of an episulfide group, a reaction between an episulfide group and a thiol group, a reaction between an episulfide group and an isocyanate group and a thiourethanation reaction between a thiol group and an isocyanate group proceed simultaneously or successively. For this reason, there are problems in that, for example, a portion with non-uniform refractive index may be generated in a resin, resulting in distortion or white turbidity in a cured product. Further, these optical materials are usually produced by injecting a polymerizable composition in which a polymerization catalyst is added into a forming die, which is produced using a mold made of metal or glass and a resin gasket or adhesive tape, and then thermally polymerizing the composition. However, resin gaskets are expensive. For this reason, recently, methods using an inexpensive adhesive tape instead of a resin gasket have been mainly employed industrially (see Patent Document 5). However, when heating and curing with a mold in which the peripheral portions of 2 molds are wrapped with an adhesive tape, depending on the type of an adhesive component, there may be a problem in that the adhesive component is eluted in the composition, resulting in white turbidity of the obtained optical material. For this reason, methods for producing an optical material, in which a thiol compound and an isocyanate compound are prepolymerized in the presence or absence of an episulfide compound and then the remaining episulfide compound is added thereto to be polymerized, have been proposed (see Patent Document 6). However, when using tetrabutylphosphonium bromide exemplified in the Examples of Patent Document 6 as a prepolymerization catalyst, not only the reaction between the thiol compound and the isocyanate compound, but also the polymerization reaction of the episulfide compound proceed simultaneously, and the viscosity of the composition is increased to 3000 cP or more, causing the problem in that it is extremely difficult to perform cast molding. Therefore, it is inappropriate for industrially producing optical materials.

[Problem 2]

Moreover, the optical material made of the episulfide compound tends to be easily yellowed at the time of the heating treatment for the surface treatment of the optical material, after long-term storage and after long-term use. In particular, a method for suppressing yellowing under conditions for the surface treatment of the optical material requiring heating at 100° C. or higher for 10 hours or longer and under conditions for the acceleration test for long-term storage has been desired. For this reason, as methods for suppressing yellowing of the optical material made of the episulfide compound, a technique for the addition of a thiol compound (Patent Document 7), a method for the addition of a compound having a $NH_2$ group and/or a compound having a NH group (Patent Document 8) and methods for the addition of phenols (Patent Documents 9 and 10) have been proposed. However, the composition in which the thiol compound and the isocyanate compound are added to the episulfide compound often causes problems in that, for example, the effect of suppressing yellowing may be insufficient, heat resistance may be significantly reduced, and because the polymerization reaction of the episulfide compound and the thiourethanation reaction proceed rapidly and randomly, a portion with non-uniform refractive index may be generated in a resin, resulting in distortion or white turbidity in a cured product. Meanwhile, as a method for suppressing yellowing of the optical material made of a composition in which the thiol compound is added to the episulfide compound, a method for the addition of a 2,2,6,6-tetramethylpiperidine compound not having a polymerizable group (Patent Document 11) has been proposed. However, though in the composition in which the thiol compound and the isocyanate compound are added to the episulfide compound, the effect of suppressing yellowing is exerted thereby, the compatibility with the optical material made of the composition in which the thiol compound and the isocyanate compound are added to the episulfide compound is bad, and there are problems in that, for example, white turbidity is generated in the optical material, and the 2,2,6,6-tetramethylpiperidine compound not having a polymerizable group is bled out to the surface of the optical material, which significantly worsens the outer appearance. As a method for improving weather resistance of the composition in which the thiol compound and the isocyanate compound are added to the episulfide compound, a method for the addition of p-toluenesulfonamide (Patent Document 12) has been proposed. However, the effect of suppressing yellowing under heating conditions is insufficient, and there are problems in that, for example, white turbidity may be generated in the optical material.

In consideration of the above-described matters, the development of a catalyst for preliminary reaction and preliminary reaction conditions, which enable preferential progress of only a thiourethanation reaction of a composition in which a thiol compound and an isocyanate compound are added to an episulfide compound almost without progress of a polymerization reaction of the episulfide, was desired. In addition, the development of a technique of suppressing yellowing of an optical material made of a composition in which a thiol compound and an isocyanate compound are added to an episulfide compound was also desired.

PRIOR ART DOCUMENTS

Patent Documents

Patent Document 1: Japanese Laid-Open Patent Publication No. H11-292950
Patent Document 2: Japanese Laid-Open Patent Publication No. 2001-131257
Patent Document 3: Japanese Laid-Open Patent Publication No. 2001-330701
Patent Document 4: Japanese Laid-Open Patent Publication No. 2007-084629
Patent Document 5: Japanese Laid-Open Patent Publication No. H10-146849
Patent Document 6: Japanese Laid-Open Patent Publication No. 2007-197615
Patent Document 7: Japanese Patent No. 3465528
Patent Document 8: Japanese Patent No. 3373800
Patent Document 9: Japanese Patent No. 3589129
Patent Document 10: Japanese Patent No. 3621600
Patent Document 11: Japanese Laid-Open Patent Publication No. 2007-321072
Patent Document 12: Japanese Patent No. 4291190

DISCLOSURE OF THE INVENTION

Problems to be Solved by the Invention

The present invention provides a catalyst for preliminary reaction and a preliminary reaction method, which are suitable for a composition that is obtained by adding a thiol compound and an isocyanate compound to an episulfide compound, and also provides a polymerizable composition for optical materials, which is capable of preventing yellowing of an optical material which contains a composition that is obtained by adding a thiol compound and an isocyanate compound to an episulfide compound.

Means for Solving the Problems

The present inventors diligently made researches in order to solve the above-described problems, and found that, by performing polymerization and curing using a polymerizable composition for optical materials containing a thiourethane oligomer obtained by preferential progress of a thiourethanation reaction of a composition comprising an episulfide compound, a thiol compound and an isocyanate compound almost without progress of a polymerization reaction of the episulfide compound, using a compound represented by formula (2) below as a catalyst for preliminary reaction, not only elution of an adhesive from a tape can be suppressed, but also distortion, white turbidity and yellowing of the obtained optical material can be significantly suppressed. Thus, the present invention was achieved.

Specifically, the present invention is as follows:
<1> A polymerizable composition for optical materials, which comprises:
a compound (a) below; and
a reaction solution, which contains a thiourethane oligomer that is obtained by preliminarily reacting a compound (b) below and a compound (c) below using a compound (d) below as a catalyst for preliminary reaction:

(a) a compound having two intramolecular episulfide groups represented by formula (1) below:

wherein m represents an integer from 0 to 4, and n represents an integer from 0 to 2;
(b) a compound having at least one isocyanate group in one molecule;
(c) a compound having at least two thiol groups in one molecule; and
(d) a compound represented by formula (2) below:

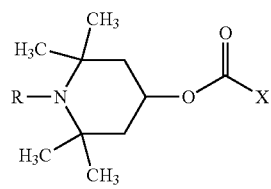

wherein R represents an alkyl group having 1 to 4 carbon atoms, and X represents an organic group which has 2 to 11 carbon atoms and contains a vinyl group, a vinylidene group or a vinylene group.
<2> A polymerizable composition for optical materials, which comprises a reaction solution containing a thiourethane oligomer that is obtained by preliminarily reacting a compound (b) below and a compound (c) below in the presence of a compound (a) below, using a compound (d) below as a catalyst for preliminary reaction:
(a) a compound having two intramolecular episulfide groups represented by formula (1) above;
(b) a compound having at least one isocyanate group in one molecule;
(c) a compound having at least two thiol groups in one molecule; and
(d) a compound represented by formula (2) above.
<3> The polymerizable composition for optical materials according to item <1> or <2>, wherein with respect to the ratio in raw materials of the polymerizable composition for optical materials, the amount of the compound (d) is 0.005 to 5 parts by mass when the total amount of the compounds (a) to (c) is 100 parts by mass.
<4> A method for producing a polymerizable composition for optical materials, comprising the steps of:
obtaining a reaction solution containing a thiourethane oligomer by preliminarily reacting a compound (b) below and a compound (c) below using a compound (d) below as a catalyst for preliminary reaction; and
mixing the reaction solution with a compound (a) below:
(a) a compound having two intramolecular episulfide groups represented by formula (1) above;
(b) a compound having at least one isocyanate group in one molecule;
(c) a compound having at least two thiol groups in one molecule; and
(d) a compound represented by formula (2) above.
<5> A method for producing a polymerizable composition for optical materials, comprising the step of forming a thiourethane oligomer by preliminarily reacting a compound (b) below and a compound (c) below in the presence of a compound (a) below, using a compound (d) below as a catalyst for preliminary reaction:
(a) a compound having two intramolecular episulfide groups represented by formula (1) above;
(b) a compound having at least one isocyanate group in one molecule;
(c) a compound having at least two thiol groups in one molecule; and
(d) a compound represented by formula (2) above.
<6> A method for producing an optical material, comprising the step of polymerizing and curing the polymerizable composition according to any one of items <1> to <3>.
<7> A cured product obtained by the production method according to item <6>.
<8> An optical material comprising the cured product according to item <7>.
<9> An optical lens comprising the optical material according to item <8>.

Advantageous Effect of the Invention

The methods for producing the polymerizable composition and the optical material of the present invention achieve significant suppression of distortion, white turbidity and yellowing, can suppress elution of an adhesive from a tape, can easily produce the optical material industrially, and therefore contribute to the development of the technical field.

EMBODIMENTS FOR CARRYING OUT THE INVENTION

Hereinafter, the present invention will be described in detail.

The compound (a) to be used in the present invention is a compound having two intramolecular episulfide groups represented by formula (1) below, and specific examples thereof include one or more types of episulfide compounds selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide.

Among them, bis(β-epithiopropyl)sulfide (formula (3)) and/or bis(β-epithiopropyl)disulfide (formula (4)) are preferred, and bis(β-epithiopropyl)sulfide is most preferred.

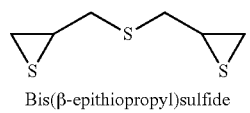

Bis(β-epithiopropyl)sulfide (3)

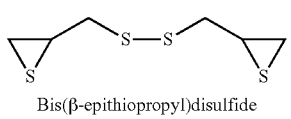

Bis(β-epithiopropyl)disulfide (4)

The compound (b) to be used in the present invention includes every compound having at least one isocyanate group in one molecule, and specific examples thereof include methyl isocyanate, ethyl isocyanate, propyl isocyanate, cyclohexyl isocyanate, phenyl isocyanate, toluyl isocyanate, diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, norbornene diisocyanate, 2,6-bis(isocyanatomethyl)decahydronaphthalene, 2,4-tolylene diisocyanate, 2,6-tolylene diisocyanate, o-tolidine diisocyanate, 4,4'-diphenylmethane diisocyanate, diphenylether diisocyanate, 1,3-phenylene diisocyanate, 1,4-phenylene diisocyanate, 4,4'-diisocyanatobiphenyl, m-xylylene diisocyanate and p-xylylene diisocyanate. Among them, regarding polyisocyanates, examples thereof include dimers and cyclic trimers obtained by biuret type reactions, isocyanates as alcohol or thiol adducts, and the like.

The compound (b) targeted for the present invention is not limited to the above-described examples. These substances may be used solely, or two or more of them may be used in combination. Among the compounds included in the above-described compound (b), a compound having two isocyanate groups in one molecule is preferred, and an aliphatic isocyanate compound (for the purpose of improving weather resistance) having an aromatic ring (for the purpose of obtaining an optical material having a high refractive index) is more preferred. Specific examples thereof include m-xylylene diisocyanate, p-xylylene diisocyanate, m-tetramethyl xylylene diisocyanate and p-tetramethyl xylylene diisocyanate.

The compound (c) to be used in the present invention includes every compound having at least two thiol groups in one molecule, and specific examples thereof include polythiols such as dimercaptomethane, 1,2-dimercaptoethane, 1,1-dimercaptoethane, 1,3-dimercaptopropane, 1,2-dimercaptopropane, 1,1-dimercaptopropane, 1,2,3-trimercaptopropane, 1,3-dimercapto-2-thiapropane, 1,4-dimercaptobutane, 1,3-dimercaptobutane, 1,2-dimercaptobutane, 1,1-dimercaptobutane, 1,4-dimercapto-2-thiabutane, 1,3-dimercapto-2-thiabutane, 1,2-dimercapto-3-thiabutane, 1,1-dimercapto-2-thiabutane, 1,1-dimercapto-3-thiabutane, trimercaptobutane, trimercaptomonothiabutane, tetramercaptobutane, bis(2-mercaptoethyl)sulfide, bis(2-mercaptoethyl)ether, bis(2,3-dimercaptopropyl)sulfide, bis(2,3-dimercaptopropyl)ether, 1,2-bis(2-mercaptoethylthio)ethane, 1,2-bis(2-mercaptoethyloxy)ethane, 1,8-dimercapto-4-(mercaptomethyl)-3,6-dithiaoctane, 4,8- or 4,7- or 5,7-dimercaptomethyl-1,11-dimercapto-3,6,9-trithiaundecane, pentaerythritol tetrakis(mercaptoacetate), pentaerythritol tetrakis(mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, o-xylylenedithiol, m-xylylenedithiol and p-xylylenedithiol; and thiols such as sulfide oligomers and disulfide oligomers which are dimers to icosamers of the aforementioned polythiols.

The compound (c) targeted for the present invention is not limited to the above-described examples. These substances may be used solely, or two or more of them may be used in combination. Among the compounds included in the above-described compound (c), bis(2-mercaptoethyl)sulfide, 2,5-bis(mercaptomethyl)-1,4-dithiane, o-xylylenedithiol, m-xylylenedithiol, p-xylylenedithiol and 1,8-dimercapto-4-(mercaptomethyl)-3,6-dithiaoctane are preferred.

The compound (d) to be used in the present invention includes every compound represented by formula (2) above, but a low-molecular-weight compound is preferred so as not to reduce the compatibility with the polymerizable composition and the refractive index of a cured product obtained after polymerizing and curing the polymerizable composition. Specifically, it is a compound, wherein X in formula (2) is the below-described structural formula (5). Pentamethylpiperidyl methacrylate (the below-described structural formula (6)), pentamethylpiperidyl acrylate (the below-described structural formula (7)) and/or pentamethylpiperidyl-4-vinylbenzoate (the below-described structural formula (8)) are more preferred, and the most preferred specific example of the compound is pentamethylpiperidyl methacrylate, which is easily available industrially.

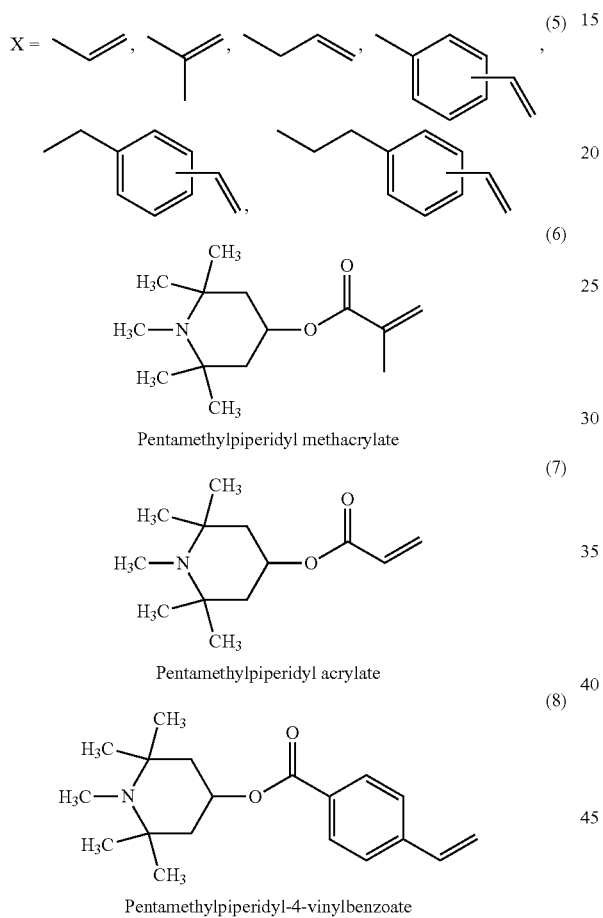

The ratios of the compounds (a), (b) and (c) in the raw material to be used in the present invention cannot be determined categorically because physical properties such as optical characteristics, strength and heat resistance and the like of an optical material obtained vary depending on the types of the respective compounds. However, the total amount of the compound (b) and the compound (c) is usually 50 to 10 parts by mass per 50 to 90 parts by mass of the compound (a) (with the proviso that the total amount of the compounds (a) to (c) is 100 parts by mass; the same applies to the following). Preferably, the total amount of the compound (b) and the compound (c) is 40 to 15 parts by mass per 60 to 85 parts by mass of the compound (a). More preferably, the total amount of the compound (b) and the compound (c) is 35 to 15 parts by mass per 65 to 85 parts by mass of the compound (a). When the amount of the compound (a) is less than 50 parts by mass, the heat resistance may be reduced, and when the amount is more than 90 parts by mass, the effect of improving the strength may not be obtained.

In addition, regarding the ratio between the NCO group of the compound (b) and the SH group of the compound (c), preferably, SH group/NCO group=1.0 to 2.5, more preferably, SH group/NCO group=1.25 to 2.25, and even more preferably, SH group/NCO group=1.5 to 2.0. When the ratio is less than 1.0, the yellowness of the cured product may become higher, and when the ratio is more than 2.5, the heat resistance may be reduced.

The ratio of the compound (d) that is a catalyst for preliminary reaction in the present invention cannot be determined categorically because it depends on the type of the compound (d) and the types and ratios of the compounds (a) to (c). However, the amount of the compound (d) is usually 0.001 to 5 parts by mass when the total amount of the compounds (a) to (c) is 100 parts by mass. Preferably, the amount of the compound (d) is 0.005 to 3 parts by mass when the total amount of the compounds (a) to (c) is 100 parts by mass. More preferably, the amount of the compound (d) is 0.01 to 1 part by mass when the total amount of the compounds (a) to (c) is 100 parts by mass.

The polymerizable composition of the present invention is characterized in that it contains a thiourethane oligomer that is obtained by preliminarily reacting the whole or a part of the compound (b) and the compound (c) in advance, using the compound (d) as a catalyst for preliminary reaction. In the preliminary reaction, thiourethane bond is formed by an addition reaction between the thiol group of the compound (b) and the isocyanate group of the compound (c), thereby obtaining the thiourethane oligomer. The production of the thiourethane oligomer can be confirmed by the measurement of the nuclear magnetic resonance spectrum and infrared absorption spectrum.

The degree of progress of the preliminary reaction can be measured, for example, by liquid chromatography and/or viscosity and/or specific gravity and/or refractive index and/or infrared absorption spectrum of the preliminary reaction product. It is preferred to control the degree of progress of the preliminary reaction in terms of suppressing elution of an adhesive from a tape and obtaining a polymerizable composition for optical materials in which distortion, white turbidity and yellowing are significantly suppressed. In particular, a technique using the infrared absorption spectrum is preferred because it is convenient and highly precise.

The reaction rate of the preliminary reaction is important for achieving sufficient effects exerted by the preliminary reaction. Specifically, the consumption of the isocyanate group of the compound (b) is important, and when the consumption of the isocyanate group is less than 50%, white turbidity may be generated in the optical material obtained from the polymerizable composition, and it is undesirable. Preferably 50% or more, and more preferably 70% or more of the isocyanate group of the compound (b) is allowed to be consumed to produce the thiourethane oligomer.

The preliminary reaction may be performed with the whole or a part of the compound (a) being added. The amount of the compound (a) to be added cannot be determined categorically because it depends on the reaction temperature and the reaction time. However, the amount is usually 0 to 80 parts by mass, and preferably 40 to 80 parts by mass when the total amount of the compound (b) and the compound (c) is 40 to 15 parts by mass. When the compound (a) is not added, the viscosity of the preliminary reaction solution becomes higher, and it may be difficult to handle it.

The temperature and the time for performing the preliminary reaction are preferably −10 to 120° C. and 0.1 to 120 hours, more preferably −5 to 100° C. and 0.1 to 60 hours, and particularly preferably 0 to 80° C. and 0.1 to 30 hours. The preliminary reaction may be performed in any atmosphere, for example, in the presence of a gas such as air, nitrogen or oxygen, in a sealed atmosphere under ordinary pressure or increased/reduced pressure, or under reduced pressure.

In the preliminary reaction, a reaction modifier can be added according to need for the purpose of extension of the pot life, dispersion of heat generated by the reaction, etc. The reaction modifier may be added at any step of the preliminary reaction. When using the reaction modifier, any type of the reaction modifier may be used as long as it controls the effects of the catalyst for preliminary reaction, but it is preferably a compound which can be used as a polymerization modifier at the time of polymerization and curing after the preliminary reaction. Specific examples thereof include halides of elements belonging to Groups 13 to 16 of the long form of the periodic table. Among them, halides of silicon, germanium, tin and antimony are preferred, and chlorides of germanium, tin and antimony, which have an alkyl group, are more preferred. Even more preferred specific examples are dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride, and dibutyltin dichloride is most preferred. Such reaction modifiers may be used solely, or two or more of them may be used in combination. The suitable amount of the reaction modifier to be used cannot be determined categorically because it varies depending on the reaction temperature, the reaction time and the ratios of the compound (b) and the compound (c). However, the amount is usually 0.00001 to 5.0 parts by mass, and preferably 0.0001 to 2.0 parts by mass when the total amount of the compound (b) and the compound (c) is 40 to 15 parts by mass.

At the time of the preliminary reaction, a part or all of additives such as a compound which can react with a part or all of the composition components to be used, an ultraviolet absorber, a blueing agent, an antioxidant, a deodorizer, an internal mold release improving agent and an internal adhesiveness improving agent may be added as performance improving agents in addition to the above-described reaction modifier.

To the polymerizable composition for optical materials of the present invention, which contains a thiourethane oligomer that is obtained by preliminarily reacting the whole or a part of the compound (b) and the compound (c) in advance, using the compound (d) as a catalyst for preliminary reaction, a polymerization catalyst may be added according to need for polymerization and curing. Examples of the polymerization catalyst include amines, phosphines, quaternary ammonium salts, quaternary phosphonium salts, a condensation product of aldehyde with an amine-based compound, a salt of carboxylic acid and ammonia, urethanes, thiourethanes, guanidines, thioureas, thiazoles, sulfenamides, thiurams, dithiocarbamates, xanthogenates, tertiary sulfonium salts, secondary iodonium salts, mineral acids, Lewis acids, organic acids, silicic acids, tetrafluoroborates, peroxides, azo-based compounds and acidic phosphoric acid esters.

The polymerization catalyst is not particularly limited as long as it exerts polymerization and curing. Further, the above-described polymerization catalysts may be used solely, or two or more of them may be used in combination. Specific preferred examples thereof include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, specific more preferred examples are triethylbenzyl ammonium chloride and/or tetra-n-butylphosphonium bromide.

The amount of the polymerization catalyst to be added is 0.001 to 5 parts by mass, preferably 0.002 to 5 parts by mass, and more preferably 0.005 to 3 parts by mass when the total amount of the compounds (a), (b) and (c) is 100 parts by mass.

At the time of polymerization and curing, a polymerization modifier may be added to the polymerizable composition for optical materials of the present invention according to need for the purpose of extension of the pot life, dispersion of heat generated by the polymerization, etc. Examples of the polymerization modifier include halides of elements belonging to Groups 13 to 16 of the long form of the periodic table.

Such polymerization modifiers may be used solely, or two or more of them may be used in combination. Among them, halides of silicon, germanium, tin and antimony are preferred, chlorides of silicon, germanium, tin and antimony are more preferred, and chlorides of germanium, tin and antimony, which have an alkyl group, are even more preferred. Specifically, dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride are most preferred.

The amount of the polymerization modifier to be added is 0.001 to 5 parts by mass, preferably 0.002 to 5 parts by mass, and more preferably 0.005 to 3 parts by mass when the total amount of the compounds (a) to (c) is 100 parts by mass.

It is surely possible to add publicly-known additives such as an antioxidant, a blueing agent, an ultraviolet absorber and a deodorizer, as optional components, to the polymerizable composition for optical materials of the present invention according to need to further improve practicability of the material obtained. Further, when the optical material of the present invention is easily released from the mold during polymerization, a publicly-known external and/or internal adhesiveness improving agent can be applied to the mold made of glass or metal to be used for polymerization and curing or added to the polymerizable composition for optical materials, and when the optical material is not easily released from the mold, a publicly-known external and/or internal mold release improving agent can be applied to the mold made of glass or metal to be used for polymerization and curing or added to the polymerizable composition for optical materials. It is effective to apply or add such an agent to improve adhesiveness or mold release characteristics between the obtained optical material and the mold.

Regarding the polymerizable composition for optical materials of the present invention, all of the composition which contains a thiourethane oligomer that is obtained by preliminarily reacting the whole or a part of the compound (b) and the compound (c) in the presence of the whole or a part of the compound (a) in advance, using the compound (d) as a catalyst for preliminary reaction; remaining amounts of the compounds (a), (b) and (c) which are not used in the preliminary reaction; and additives such as a compound which can react with a part or all of the composition components, a polymerization catalyst, a polymerization modifier, an adhesiveness improving agent or mold release improving agent, an antioxidant, a blueing agent, an ultraviolet absorber, a deodorizer, etc. may be mixed together simultaneously in the same container with stirring. Alternatively, the respective raw materials may be added and mixed in a stepwise fashion. Alternatively, respective several components may be separately mixed and then mixed again in the same container. The respective raw materials, additives, etc. may be mixed in any order.

At the time of mixing, the temperature to be set, the time required for mixing, etc. are basically not limited as long as the components can be sufficiently mixed, but excessive temperature and time tend to cause an undesirable reaction between raw materials and additives and further may cause elevation of the viscosity to make it difficult to carry out the cast molding operation, and therefore are inappropriate.

The mixing temperature is in the range of from about −50° C. to about 100° C., preferably in the range of from −30° C. to 70° C., and more preferably in the range of from −5° C. to 50° C. The mixing time is 1 minute to 12 hours, preferably 5 minutes to 10 hours, and most preferably about 5 minutes to 6 hours. According to need, mixing may be carried out with active energy ray being irradiated or blocked. After that, the deaeration treatment may be carried out according to the below-described method.

In the method for producing the polymerizable composition for optical materials of the present invention, there is a case where the deaeration treatment is carried out after preparation of the polymerizable composition by the above-described mixing. It is preferred to carry out the deaeration treatment in advance before polymerization and curing of the polymerizable composition for optical materials in terms of achieving high transparency of the optical material obtained by polymerization and curing. It is preferred to carry out the deaeration treatment under reduced pressure during or after mixing.

The deaeration treatment conditions are as follows: under a reduced pressure of 0.1 to 15000 Pa; 1 minute to 24 hours; and 0° C. to 100° C. The degree of pressure reduction is preferably 1 to 10000 Pa, and more preferably 1 to 5000 Pa. The degree of pressure reduction may be varied within these ranges. The deaeration time is preferably 5 minutes to 18 hours, and more preferably 10 minutes to 12 hours. The temperature at the time of deaeration is preferably 5 to 80° C., more preferably 10 to 60° C., and the temperature may be varied within these ranges.

The operation of surface renewal of the polymerizable composition for optical materials by means of stirring, blowing a gas, vibration caused by ultrasonic wave or the like during the deaeration treatment is preferable in terms of the enhancement of the deaeration effect. Components removed by the deaeration treatment are mainly dissolved gases such as hydrogen sulfide, low-boiling substances such as low-molecular-weight mercaptan, etc., but the type of components is not particularly limited as long as the effects of the deaeration treatment are exerted.

The polymerizable composition for optical materials thus obtained can be purified by filtering impurities, etc. with a filter or the like immediately before polymerization and curing. It is desirable to filter impurities and the like from the polymerizable composition for optical materials to be purified using a filter for further improving the quality of the optical material of the present invention. The pore diameter of the filter to be used herein is about 0.05 to 10 μm, and generally 0.1 to 1.0 μm. The material of the filter is preferably PTFE, PET, PP or the like.

The optical material of the present invention is obtained by polymerizing and curing the above-described polymerizable composition for optical materials. Usually, the polymerizable composition for optical materials is injected into a mold made of glass or metal, and then subjected to polymerization and curing by means of heating with an electric furnace, or irradiation of an active energy ray such as ultraviolet light using an active energy ray generation apparatus or the like.

As a mold made of glass or metal into which the polymerizable composition for optical materials is injected, usually, a mold in which the peripheral portions of 2 opposed molds are wrapped with an adhesive tape to which an adhesive material is applied, or a mold to which a resin gasket is attached is used. Examples of the adhesive material of the tape include silicon-based, acrylic-based, epoxy-based and rubber-based materials, etc. However, there are problems in that, depending on the type of the adhesive material, mixing of air bubbles, liquid leakage, a remaining portion of the adhesive material and white turbidity of optical resin may be caused, and mold release characteristics may become worse. Therefore, acrylic-based and silicon-based adhesive materials are preferred, and silicon-based adhesive materials are more preferred.

The time of polymerization by means of heating with an electric furnace, or irradiation of an active energy ray such as ultraviolet light using an active energy ray generation apparatus or the like is 0.1 to 100 hours, and usually 1 to 48 hours. The polymerization temperature is −10 to 160° C., and usually −10 to 140° C. The polymerization may be conducted by carrying out a step of holding the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps.

Further, it is preferred to anneal the material at a temperature of 50 to 150° C. for about 5 minutes to 5 hours after the completion of the polymerization in terms of eliminating distortion of the optical material. Moreover, a surface treatment such as dyeing, hard coating, antireflection treatment, and imparting antifog properties, antifouling properties, impact resistance or the like can be performed according to need.

EXAMPLES

Hereinafter, the present invention will be specifically described by way of working examples, but the present invention is not limited thereto. Analysis of optical materials obtained by polymerization was conducted in manners described below.

[Consumption of Isocyanate of the Compound (b)]

FT-IR (JASCO Corporation, FT/IR-4200) was used to measure the intensity ratio of spectrum of the preliminary reaction solution (the absorbance of the N=C=O stretching vibration)/(the absorbance of the $CH_2$ stretching vibration). The intensity ratio of (the absorbance of the N=C=O stretching vibration)/(the absorbance of the $CH_2$ stretching vibration) at the start of the preliminary reaction was used as a reference, and the remaining amount of the isocyanate group was calculated from the following formula: ((the intensity ratio of spectrum at the start of the preliminary reaction)−(the intensity ratio of spectrum of the preliminary reaction solution))/(the intensity ratio of spectrum at the start of the preliminary reaction)×100%.

[Viscosity of Preliminary Reaction Solution]

The viscosity of the preliminary reaction solution at 20° C. was measured using a B-type viscometer.

[Measurement of Heat Resistance of Optical Materials]

A sample was cut to have a thickness of 3 mm, and the TMA measurement (Seiko Instruments Inc., TMA/SS6100) was carried out by adding 10 g of weight to a pin (φ: 0.5 mm) and elevating the temperature at a rate of 30° C. to 10° C./min. to measure the softening point, which was utilized as an index for heat resistance.

[Color Phase of Optical Materials (YI)]

The YI value of a plastic lens was measured using a spectroscopic colorimeter JS555 (Color Techno System Corporation). A circular flat plate of the plastic lens (thickness: 2.5 mm, φ: 60 mm) was produced and then it was subjected to the measurement.

[The Rate of Generation of White Turbidity in Optical Materials]

100 circular flat plates of plastic lens (thickness: 10.0 mm, φ: 83 mm) were visually observed under a high-pressure mercury vapor lamp in a dark room, and when turbidity was confirmed in a lens, it was judged as having white turbidity, thereby calculating the rate of generation of white turbidity.

[Thermal Stability of Optical Materials]

The thermal stability was evaluated by measuring the rate of white turbidity (%), the color phase (YI) and the heat resistance (softening point obtained by the TMA measurement) at an early stage and after heating. Heating was carried out at 150° C. for 10 hours.

[Refractive Index and Abbe Number of Optical Materials]

Regarding the refractive index and the Abbe number of optical materials, the refractive index at the e-line and the Abbe number at the d-line at 25° C. were measured using a digital precision refractometer (Shimadzu Corporation, KPR-200).

Example 1

75.0 parts by mass of bis(β-epithiopropyl)sulfide as the compound (a), 11.3 parts by mass of m-tetramethyl xylylene diisocyanate as the compound (b), 13.7 parts by mass of m-xylylenedithiol as the compound (c) and 0.025 part by mass of pentamethylpiperidyl methacrylate as the compound (d) were mixed together and subjected to a thiourethanation preliminary reaction at 20° C. for 16 hours, and it was confirmed that the consumption of the isocyanate group of the compound (b) was 80% by FT-IR. Further, it was confirmed that the consumption of the episulfide group was less than 1% by FT-IR. The viscosity of the preliminary reaction solution at 20° C. was 50 cP. With this preliminary reaction solution, 0.025 part by mass of tetrabutylphosphonium bromide as a polymerization catalyst, 0.01 part by mass of dibutyltin dichloride as a polymerization modifier and 1.0 part by mass of 2-(2-hydroxy-5-tert-octylphenyl) benzotriazole as a ultraviolet absorber were mixed to produce a homogeneous polymerizable composition. The obtained polymerizable composition was subjected to the deaeration treatment and filtered using a PTFE membrane filter of 0.5 µm. Next, the composition was injected into a mold in which 2 opposed glass molds (φ: 83 mm) were used and the peripheral portions thereof were wrapped with an adhesive tape to which a silicon-based adhesive material was applied. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 1.8, the heat resistance was 80° C., and the rate of generation of white turbidity was 0%. Further, heating was performed at 150° C. for 10 hours to evaluate the thermal stability. Regarding the results after heating, YI was 3.9, the heat resistance was 80° C., and the rate of generation of white turbidity was 1%. The evaluation results are shown in Table 1.

The obtained cured product not only had excellent optical characteristics and physical properties, but also had good surface condition and color tone, and also had good heat resistance, optical distortion and transparency.

Example 2

80.0 parts by mass of bis(β-epithiopropyl)sulfide as the compound (a), 8.4 parts by mass of m-tetramethyl xylylene diisocyanate as the compound (b), 11.6 parts by mass of m-xylylenedithiol as the compound (c), 0.025 part by mass of pentamethylpiperidyl methacrylate as the compound (d) and 1.0 part by mass of 2-(2-hydroxy-5-tert-octylphenyl) benzotriazole as a ultraviolet absorber were mixed together and subjected to a thiourethanation preliminary reaction at 25° C. for 10 hours, and it was confirmed that the consumption of the isocyanate group of the compound (b) was 76% by FT-IR. Further, it was confirmed that the consumption of the episulfide group was less than 1% by FT-IR. The viscosity of the preliminary reaction solution at 20° C. was 45 cP. With this preliminary reaction solution, 0.020 part by mass of tetrabutylphosphonium bromide as a polymerization catalyst was mixed to produce a homogeneous polymerizable composition. The obtained polymerizable composition was subjected to the deaeration treatment and filtered using a PTFE membrane filter of 0.5 µm. Next, the composition was injected into a mold in which 2 opposed glass molds (φ: 83 mm) were used and formed into the mold using a resin gasket. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 2.0, the heat resistance was 83° C., and the rate of generation of white turbidity was 0%. Further, heating was performed at 150° C. for 10 hours to evaluate the thermal stability. Regarding the results after heating, YI was 4.2, the heat resistance was 82° C., and the rate of generation of white turbidity was 2%. The evaluation results are shown in Table 1.

The obtained cured product not only had excellent optical characteristics and physical properties, but also had good surface condition and color tone, and also had good heat resistance, optical distortion and transparency.

Example 3

50.0 parts by mass of bis(β-epithiopropyl)sulfide as the compound (a), 28.3 parts by mass of m-tetramethyl xylylene diisocyanate as the compound (b), 21.7 parts by mass of m-xylylenedithiol as the compound (c), 0.050 part by mass of pentamethylpiperidyl methacrylate as the compound (d) and 1.0 part by mass of 2-(2-hydroxy-5-tert-octylphenyl) benzotriazole as a ultraviolet absorber were mixed together and subjected to a thiourethanation preliminary reaction at 30° C. for 6 hours, and it was confirmed that the consumption of the isocyanate group of the compound (b) was 70% by FT-IR. Further, it was confirmed that the consumption of the episulfide group was less than 1% by FT-IR. The viscosity of the preliminary reaction solution at 20° C. was 80 cP. With this preliminary reaction solution, 0.025 part by mass of tetrabutylphosphonium bromide as a polymerization catalyst and 0.02 part by mass of dibutyltin dichloride as a polymerization modifier were mixed to produce a homogeneous polymerizable composition. The obtained polymerizable composition was subjected to the deaeration treatment and filtered using a PTFE membrane filter of 1.0 μm. Next, the composition was injected into a mold in which 2 opposed glass molds (φ: 83 mm) were used and the peripheral portions thereof were wrapped with an adhesive tape to which a silicon-based adhesive material was applied. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 3.6, the heat resistance was 67° C., and the rate of generation of white turbidity was 1%. Further, heating was performed at 150° C. for 10 hours to evaluate the thermal stability. Regarding the results after heating, YI was 5.9, the heat resistance was 67° C., and the rate of generation of white turbidity was 3%. The evaluation results are shown in Table 1.

The obtained cured product not only had excellent optical characteristics and physical properties, but also had good surface condition and color tone, and also had good heat resistance, optical distortion and transparency.

Example 4

8.4 parts by mass of m-tetramethyl xylylene diisocyanate as the compound (b), 11.6 parts by mass of m-xylylenedithiol as the compound (c) and 0.025 part by mass of pentamethylpiperidyl methacrylate as the compound (d) were mixed together and subjected to a thiourethanation preliminary reaction at 30° C. for 1 hour, and it was confirmed that the consumption of the isocyanate group of the compound (b) was 70% by FT-IR. Further, the viscosity of the preliminary reaction solution at 20° C. was 2800 cP. With this preliminary reaction solution, 80.0 parts by mass of bis(β-epithiopropyl)sulfide as the compound (a), 0.025 part by mass of tetrabutylphosphonium bromide as a polymerization catalyst, 0.02 part by mass of dibutyltin dichloride as a polymerization modifier and 1.0 part by mass of 2-(2-hydroxy-5-tert-octylphenyl)benzotriazole as a ultraviolet absorber were mixed to produce a homogeneous polymerizable composition. The viscosity of the obtained polymerizable composition at 20° C. was 50 cP. The obtained polymerizable composition was subjected to the deaeration treatment and filtered using a PTFE membrane filter of 1.0 μm. Next, the composition was injected into a mold in which 2 opposed glass molds (φ: 83 mm) were used and the peripheral portions thereof were wrapped with an adhesive tape to which a silicon-based adhesive material was applied. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 1.8, the heat resistance was 80° C., and the rate of generation of white turbidity was 2%. Further, heating was performed at 150° C. for 10 hours to evaluate the thermal stability. Regarding the results after heating, YI was 3.8, the heat resistance was 80° C., and the rate of generation of white turbidity was 3%. The evaluation results are shown in Table 1.

The obtained cured product not only had excellent optical characteristics and physical properties, but also had good surface condition and color tone, and also had good heat resistance, optical distortion and transparency.

Examples 5-22

The same operation as that in Examples 1-4 was carried out using compositions shown in Table 1. The obtained cured products not only had excellent optical characteristics and physical properties, but also had good surface condition and color tone, and also had good heat resistance, optical distortion and transparency. The results are shown in Table 1.

Comparative Example 1

75.0 parts by mass of bis(β-epithiopropyl)sulfide as the compound (a), 11.3 parts by mass of m-tetramethyl xylylene diisocyanate as the compound (b) and 13.7 parts by mass of m-xylylenedithiol as the compound (c) were mixed together at 20° C. but not subjected to a preliminary reaction. It was confirmed that both of the consumption of the isocyanate group of the compound (b) and the consumption of the episulfide group were less than 1% by FT-IR. The viscosity of the composition solution at 20° C. was 10 cP. With this solution, 0.025 part by mass of tetrabutylphosphonium bromide as a polymerization catalyst, 0.01 part by mass of dibutyltin dichloride as a polymerization modifier and 1.0 part by mass of 2-(2-hydroxy-5-tert-octylphenyl)benzotriazole as a ultraviolet absorber were mixed to produce a homogeneous polymerizable composition. The obtained polymerizable composition was subjected to the deaeration treatment and filtered using a PTFE membrane filter of 0.5 μm. Next, the composition was injected into a mold in which 2 opposed glass molds (φ: 83 mm) were used and the peripheral portions thereof were wrapped with an adhesive tape to which a silicon-based adhesive material was applied. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 1.9, the heat resistance was 80° C., and the rate of generation of white turbidity was 95% and optical distortion was seen. Further, heating was performed at 150° C. for 10 hours to evaluate the thermal stability. Regarding the results after heating, YI was 10.2, the heat resistance was 77° C., and the rate of generation of white turbidity was 100%. The evaluation results are shown in Table 1.

Comparative Example 2

75.0 parts by mass of bis(β-epithiopropyl)sulfide as the compound (a), 11.3 parts by mass of m-tetramethyl xylylene diisocyanate as the compound (b), 13.7 parts by mass of m-xylylenedithiol as the compound (c) and 0.1 part by mass of dibutyltin dichloride as a catalyst for preliminary reaction were mixed together and subjected to a thiourethanation preliminary reaction at 50° C. for 24 hours, and it was confirmed that the consumption of the isocyanate group of the compound (b) was 52% by FT-IR. Further, it was confirmed that the consumption of the episulfide group was less than 1% by FT-IR. The viscosity of the preliminary reaction solution at 20° C. was 35 cP. With this preliminary reaction solution, 0.5 part by mass of tetrabutylphosphonium bromide as a polymerization catalyst and 1.0 part by mass of 2-(2-hydroxy-5-tert-octylphenyl)benzotriazole as a ultraviolet absorber were mixed to produce a homogeneous polymerizable composition. The obtained polymerizable composition was subjected to the deaeration treatment and filtered using a PTFE membrane filter of 0.5 μm. Next, the composition was injected into a mold in which 2 opposed glass molds (φ: 83 mm) were used and the peripheral portions thereof were wrapped with an adhesive tape to which a silicon-based adhesive material was applied. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 1.9, the heat resistance was 80° C., and the rate of generation of white turbidity was 87% and optical distortion was seen. Further, heating was performed at 150° C. for 10 hours to evaluate the thermal stability. Regarding the results after heating, YI was 9.1, the heat resistance was 78° C., and the rate of generation of white turbidity was 93%. The evaluation results are shown in Table 1.

Comparative Example 3

75.0 parts by mass of bis(β-epithiopropyl)sulfide as the compound (a), 11.3 parts by mass of m-tetramethyl xylylene diisocyanate as the compound (b), 13.7 parts by mass of m-xylylenedithiol as the compound (c) and 0.025 part by mass of tetrabutylphosphonium bromide as a catalyst for preliminary reaction were mixed together and subjected to a thiourethanation preliminary reaction at 20° C. for 3 hours, and it was confirmed that the consumption of the isocyanate group of the compound (b) was 100% by FT-IR. Further, it was confirmed that the consumption of the episulfide group was 25% by FT-IR. The viscosity of the preliminary reaction solution at 20° C. was 5200 cP. With this preliminary reaction solution, 0.01 part by mass of dibutyltin dichloride as a polymerization modifier and 1.0 part by mass of 2-(2-hydroxy-5-tert-octylphenyl)benzotriazole as a ultraviolet absorber were mixed to produce a homogeneous polymerizable composition. The obtained polymerizable composition was subjected to the deaeration treatment and filtered using a PTFE membrane filter of 1.0 μm. Next, the composition was injected into a mold in which 2 opposed glass molds (φ: 83 mm) were used and the peripheral portions thereof were wrapped with an adhesive tape to which a silicon-based adhesive material was applied. The composition was polymerized and cured at 30° C. for 10 hours using an oven, then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour. YI of the obtained resin was 2.0, the heat resistance was 80° C., and the rate of generation of white turbidity was 12% and optical distortion was seen. Further, heating was performed at 150° C. for 10 hours to evaluate the thermal stability. Regarding the results after heating, YI was 10.2, the heat resistance was 78° C., and the rate of generation of white turbidity was 19%. The evaluation results are shown in Table 1.

Comparative Example 4

80.0 parts by mass of bis(β-epithiopropyl)sulfide as the compound (a), 9.4 parts by mass of m-tetramethyl xylylene diisocyanate as the compound (b), 10.6 parts by mass of bis(2-mercaptoethyl)sulfide as the compound (c) and 0.030 part by mass of N,N-dimethyl-2-aminoethanol as a catalyst for preliminary reaction were mixed together and subjected to a thiourethanation preliminary reaction at 20° C. for 2 hours, and it was confirmed that the consumption of the isocyanate group of the compound (b) was 90% by FT-IR. Further, it was confirmed that the consumption of the episulfide group was 34% by FT-IR. The viscosity of the preliminary reaction solution at 20° C. was 13500 cP. With this preliminary reaction solution, 0.010 part by mass of tetrabutylphosphonium bromide as a polymerization catalyst, 0.05 part by mass of dibutyltin dichloride as a polymerization modifier and 1.0 part by mass of 2-(2-hydroxy-5-tert-octylphenyl)benzotriazole as a ultraviolet absorber were mixed, but the mixture was not a homogeneous polymerizable composition. It was difficult to filter the mixture, and it was impossible to inject the mixture into the mold. The evaluation results are shown in Table 1.

Comparative Example 5

80.0 parts by mass of bis(β-epithiopropyl)sulfide as the compound (a), 9.4 parts by mass of m-tetramethyl xylylene diisocyanate as the compound (b), 10.6 parts by mass of bis(2-mercaptoethyl)sulfide as the compound (c) and 0.030 part by mass of 1,2,2,6,6-pentamethylpiperidine as a catalyst for preliminary reaction were mixed together and subjected to a thiourethanation preliminary reaction at 20° C. for 4 hours, and it was confirmed that the consumption of the isocyanate group of the compound (b) was 90% by FT-IR. Further, it was confirmed that the consumption of the episulfide group was 29% by FT-IR. The viscosity of the preliminary reaction solution at 20° C. was 11500 cP. With this preliminary reaction solution, 0.010 part by mass of tetrabutylphosphonium bromide as a polymerization catalyst, 0.05 part by mass of dibutyltin dichloride as a polymerization modifier and 1.0 part by mass of 2-(2-hydroxy-5-tert-octylphenyl)benzotriazole as a ultraviolet absorber were mixed, but the mixture was not a homogeneous polymerizable composition. It was difficult to filter the mixture, and it was impossible to inject the mixture into the mold. The evaluation results are shown in Table 1.

TABLE 1

| | Prepolymerization composition (parts by mass) | | | | Reaction rate of NCO group (%) | Viscosity (20°C) cP | Compound to be added after prepolymerization (parts by mass) | | | Cured product | | | | | After heating cured product | | |
|---|---|---|---|---|---|---|---|---|---|---|---|---|---|---|---|---|---|
| | Compound (a) | Compound (b) | Compound (c) | Compound (d) | | | Compound (a) | Compound (c) | Others | Rate of white turbidity (%) | Heat resistance (°C) | YI | Refractive index ne | Abbe number vd | Rate of white turbidity (%) | Heat resistance (°C) | YI |
| Example 1 | a-1(75.0) | b-1(11.3) | c-1(13.7) | d-1(0.025) | 80 | 50 | | | TBPB-B(0.025) DBTDC(0.01) | 0 | 80 | 1.8 | 1.69 | 33 | 1 | 80 | 3.9 |
| Example 2 | a-1(80.0) | b-1(8.4) | c-1(11.6) | d-1(0.025) | 76 | 45 | | | TBPB-B(0.020) DBTDC(0.01) | 0 | 83 | 2.0 | 1.69 | 34 | 2 | 82 | 4.2 |
| Example 3 | a-1(50.0) | b-1(28.3) | c-1(21.7) | d-1(0.050) | 70 | 80 | | | TBPB-B(0.025) DBTDC(0.02) | 1 | 67 | 3.6 | 1.66 | 32 | 3 | 67 | 5.9 |
| Example 4 | | b-1(8.4) | c-1(11.6) | d-1(0.025) | 70 | 2800 | a-1(80.0) | | TBPB-B(0.025) DBTDC(0.01) | 2 | 80 | 1.8 | 1.69 | 33 | 3 | 80 | 3.8 |
| Example 5 | a-1(20.0) | b-1(11.3) | c-1(13.7) | d-1(0.025) | 80 | 250 | a-1(55.0) | | TBPB-B(0.025) DBTDC(0.01) | 0 | 80 | 1.8 | 1.69 | 33 | 1 | 79 | 3.2 |
| Example 6 | a-1(75.0) | b-1(11.3) | c-1(13.7) | d-1(0.5) | 80 | 50 | | | TBPB-B(0.025) DBTDC(0.01) | 0 | 80 | 1.8 | 1.69 | 33 | 1 | 80 | 4.0 |
| Example 7 | a-1(75.0) | b-1(11.3) | c-1(13.7) | d-2(0.025) | 80 | 50 | | | TBPB-B(0.025) DBTDC(0.01) | 0 | 80 | 1.8 | 1.69 | 33 | 1 | 80 | 3.7 |
| Example 8 | a-1(75.0) | b-1(11.3) | c-1(13.7) | d-3(0.030) | 80 | 50 | | | TBPB-B(0.025) DBTDC(0.01) | 0 | 80 | 1.8 | 1.69 | 33 | 0 | 80 | 4.1 |
| Example 9 | a-1(80.0) | b-1(8.4) | c-1(11.6) | d-1(0.025) | 100 | 115 | | | TBPB-B(0.020) DBTDC(0.01) | 0 | 83 | 2.0 | 1.69 | 34 | 0 | 82 | 4.1 |
| Example 10 | a-1(70.0) | b-1(19.4) | c-2(10.6) | d-1(3.5) | 70 | 45 | | | TBPB-B(0.025) DBTDC(0.30) | 4 | 79 | 2.2 | 1.69 | 35 | 5 | 79 | 3.3 |
| Example 11 | a-1(70.0) | b-1(4.0) | c-2(5.0) | d-1(0.025) | 70 | 40 | a-1(20.0) | c-2(1.0) | TBPB-B(0.025) DBTDC(0.01) | 1 | 83 | 3.3 | 1.70 | 35 | 2 | 82 | 5.7 |
| Example 12 | a-1(80.0) | b-1(4.0) | c-2(5.0) | d-1(0.025) | 100 | 40 | a-1(10.0) | c-2(1.0) | TBPB-B(0.025) DBTDC(0.01) | 0 | 83 | 3.3 | 1.70 | 35 | 1 | 83 | 5.6 |
| Example 13 | a-1(65.0) | b-1(18.0) | c-2(17.0) | d-1(0.025) | 82 | 55 | | | TBPB-B(0.035) DBTDC(0.01) | 0 | 70 | 1.5 | 1.67 | 35 | 0 | 70 | 3.7 |
| Example 14 | a-1(50.0) | b-1(29.5) | c-2(20.5) | d-1(1.2) | 92 | 250 | | | TBPB-B(0.025) DBTDC(0.05) | 3 | 65 | 3.5 | 1.66 | 34 | 4 | 64 | 4.9 |
| Example 15 | a-1(80.0) | b-2(9.0) | c-2(11.0) | d-1(0.025) | 72 | 40 | | | TBPB-B(0.025) DBTDC(0.01) | 1 | 74 | 2.8 | 1.69 | 34 | 1 | 73 | 5.2 |
| Example 16 | a-1(80.0) | b-2(7.9) | c-1(12.1) | d-1(0.025) | 80 | 55 | | | TEBA-C(0.020) DBTDC(0.01) | 0 | 76 | 2.3 | 1.69 | 33 | 2 | 76 | 4.4 |
| Example 17 | a-1(80.0) | b-2(7.1) | c-3(12.9) | d-1(0.025) | 78 | 60 | | | TBPB-B(0.025) DBTDC(0.01) | 1 | 78 | 3.0 | 1.70 | 35 | 2 | 78 | 5.9 |
| Example 18 | a-1(80.0) | b-1(7.7) | c-4(12.3) | d-1(0.025) | 55 | 220 | | | TBPB-B(0.025) DBTDC(0.01) | 6 | 76 | 1.7 | 1.69 | 35 | 6 | 76 | 3.8 |
| Example 19 | a-1(85.0) | b-3(7.1) | c-2(7.9) | d-1(0.025) | 73 | 60 | | | TBPB-B(0.025) DBTDC(0.01) | 1 | 79 | 3.7 | 1.69 | 36 | 2 | 79 | 5.9 |
| Example 20 | a-1(85.0) | b-4(5.9) | c-1(9.1) | d-1(0.025) | 74 | 60 | | | TBPB-B(0.025) DBTDC(0.01) | 1 | 79 | 3.1 | 1.70 | 34 | 1 | 78 | 5.4 |
| Example 21 | a-1(75.0) | b-1(11.3) | c-1(13.7) | d-1(0.030) | 78 | 50 | | | TBPB-B(0.025) DBTDC(0.01) | 2 | 78 | 2.0 | 1.71 | 33 | 3 | 77 | 4.1 |
| Example 22 | a-2(80.0) | b-2(9.0) | c-2(11.0) | d-1(0.025) | 70 | 40 | | | TBPB-B(0.025) DBTDC(0.01) | 2 | 71 | 3.0 | 1.71 | 34 | 3 | 70 | 5.3 |
| Comparative Example 1 | a-1(75.0) | b-1(11.3) | c-1(13.7) | | <1 | 10 | | | TBPB-B(0.025) DBTDC(0.01) | 95 | 80 | 1.9 | 1.69 | 33 | 100 | 77 | 10.2 |

TABLE 1-continued

| | Prepolymerization composition (parts by mass) | | | | Reaction rate of NCO group (%) | Viscosity (20° C.) cP | Compound to be added after prepolymerization (parts by mass) | | Cured product | | | | | After heating cured product | | |
|---|---|---|---|---|---|---|---|---|---|---|---|---|---|---|---|---|
| | Compound (a) | Compound (b) | Compound (c) | Compound (d) | | | Compound (a) | Compound (c) | Others | Rate of white turbidity (%) | Heat resistance (° C.) | YI | Refractive index ne | Abbe number vd | Rate of white turbidity (%) | Heat resistance (° C.) | YI |
| Comparative Example 2 | a-1(75.0) | b-1(11.3) | c-1(13.7) | DBTDC(0.10) | 52 | 35 | | | TBPB-B(0.50) | 87 | 80 | 1.9 | 1.69 | 33 | 93 | 78 | 9.1 |
| Comparative Example 3 | a-1(75.0) | b-1(11.3) | c-1(13.7) | TBPB-B(0.025) | 100 | 5200 | | | DBTDC(0.01) | 12 | 80 | 2.0 | 1.69 | 33 | 19 | 78 | 10.2 |
| Comparative Example 4 | a-1(80.0) | b-1(9.4) | c-2(10.6) | DMAE(0.03) | 90 | 13500 | | | BPB-B(0.01) DBTDC(0.05) | It was impossible to inject the product into the mold. | | | | | | | |
| Comparative Example 5 | a-1(80.0) | b-1(9.4) | c-2(10.6) | PMP(0.03) | 90 | 11500 | | | TBPB-B(0.01) DBTDC(0.05) | It was impossible to inject the product into the mold. | | | | | | | | a-1 = bis(β-epithiopropyl)sulfide
a-2 = bis(β-epithiopropyl)disulfide
b-1 = m-tetramethyl xylylene diisocyanate
b-2 = m-xylylene diisocyanate
b-3 = isophorone diisocyanate
b-4 = 1,3-bis(isocyanatomethyl)cyclohexane
c-1 = m-xylylenedithiol
c-2 = bis(2-mercaptoethyl)sulfide
c-3 = 2,5-bis(mercaptomethyl)-1,4-dithiane
c-4 = 1,8-dimercapto-4-(mercaptomethyl)-3,6-dithiaoctane
d-1 = 1,2,2,6,6-pentamethylpiperidyl methacrylate
d-2 = 1,2,2,6,6-pentamethylpiperidyl acrylate
d-3 = 1,2,2,6,6-pentamethylpiperidyl-4-vinylbenzoate
TBPB-B = tetrabutylphosphonium bromide
TEBA-C = triethylbenzyl ammonium chloride
DBTDC = dibutyltin dichloride
DMAE = N,N-dimethyl-2-aminoethanol
PMP = 1,2,2,6,6-pentamethylpiperidine

Thus, by performing polymerization and curing using the polymerizable composition for optical materials containing the thiourethane oligomer obtained by preferential progress of the thiourethanation reaction almost without progress of the polymerization reaction of the episulfide compound using the compound (d) as the catalyst for preliminary reaction, not only distortion, white turbidity and yellowing of the obtained optical material can be significantly suppressed, but also elution of the adhesive from the tape can be suppressed.

The invention claimed is:

1. A polymerizable composition for optical materials, which comprises:
   1) a compound (a) below; and
   2) a reaction solution, which contains a thiourethane oligomer that is obtained by preliminarily reacting a compound (b) below and a compound (c) below using a compound (d) below as a catalyst for a preliminary reaction, wherein, the preliminary reaction is conducted substantially in the absence of polymerization of an episulfide compound (a):
   (a) a compound having two intramolecular episulfide groups represented by formula (1) below:

(1)

wherein m represents an integer from 0 to 4, and n represents an integer from 0 to 2;
   (b) a compound having at least one isocyanate group in one molecule;
   (c) a compound having at least two thiol groups in one molecule; and
   (d) a compound represented by formula (2) below:

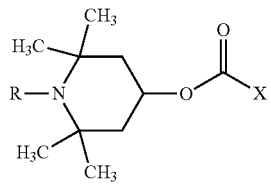

(2)

wherein R represents an alkyl group having 1 to 4 carbon atoms, and X represents an organic group which has 2 to 11 carbon atoms and contains a vinyl group, a vinylidene group or a vinylene group.

2. A polymerizable composition for optical materials of claim 1, which comprises a reaction solution containing a thiourethane oligomer that is obtained by preliminarily reacting a compound (b) and a compound (c) in the presence of a compound (a), using a compound (d) as a catalyst for preliminary reaction:
   (a) a compound having two intramolecular episulfide groups represented by formula (1).

3. The polymerizable composition for optical materials according to claim 1, wherein with respect to the ratio in raw materials of the polymerizable composition for optical materials, the amount of the compound (d) is 0.005 to 5 parts by mass when the total amount of the compounds (a) to (c) is 100 parts by mass.

4. A method for producing the polymerizable composition for optical materials of claim 1, comprising:
   obtaining a reaction solution containing a thiourethane oligomer by preliminarily reacting a compound (b) below and a compound (c) below using a compound (d) below as a catalyst for preliminary reaction; and
   mixing the reaction solution with a compound (a) below:
   (a) a compound having two intramolecular episulfide groups represented by formula (1);

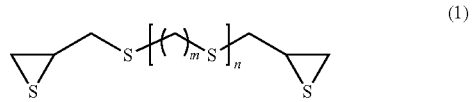

(1)

(b) a compound having at least one isocyanate group in one molecule;
   (c) a compound having at least two thiol groups in one molecule; and
   (d) a compound represented by formula (2)

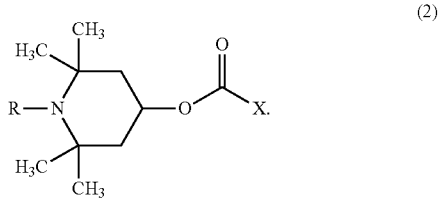

(2)

5. A method for producing an optical material, comprising the step of polymerizing and curing the polymerizable composition according to claim 1.

6. A cured product obtained by the production method according to claim 5.

7. An optical material comprising the cured product according to claim 6.

8. An optical lens comprising the optical material according to claim 7.

* * * * *